US007465412B2

(12) United States Patent
Pickens et al.

(10) Patent No.: US 7,465,412 B2
(45) Date of Patent: Dec. 16, 2008

(54) CALCIUM HYPOCHLORITE COMPOSITION

(75) Inventors: Stanley R. Pickens, Monroeville, PA (US); Fred Abraham, Wheeling, WV (US); Donald W. DuBois, Magnolia, TX (US)

(73) Assignee: PPG Industries Ohio, Inc., Cleveland, OH (US)

( * ) Notice: Subject to any disclaimer, the term of this patent is extended or adjusted under 35 U.S.C. 154(b) by 492 days.

(21) Appl. No.: 11/065,231

(22) Filed: Feb. 24, 2005

(65) Prior Publication Data

US 2006/0091356 A1 May 4, 2006

Related U.S. Application Data

(60) Provisional application No. 60/622,736, filed on Oct. 28, 2004.

(51) Int. Cl.
*C01B 11/06* (2006.01)

(52) U.S. Cl. .............................. 252/187.28; 252/187.1; 252/187.23; 252/187.24; 252/187.27

(58) Field of Classification Search ............ 252/187.24, 252/187.1
See application file for complete search history.

(56) References Cited

U.S. PATENT DOCUMENTS

| | | | | |
|---|---|---|---|---|
| 3,234,141 | A * | 2/1966 | Robson | 252/186.44 |
| 3,562,165 | A * | 2/1971 | Altieri | 510/375 |
| 3,793,216 | A | 2/1974 | Dychdala et al. | |
| 4,192,763 | A * | 3/1980 | Buchan | 252/187.3 |
| 4,201,756 | A * | 5/1980 | Saeman et al. | 423/266 |
| 4,289,640 | A * | 9/1981 | Falivene | 510/365 |
| 4,334,610 | A * | 6/1982 | Ota et al. | 206/205 |
| 4,355,014 | A * | 10/1982 | Murakami et al. | 423/265 |
| 4,594,091 | A | 6/1986 | Girvan | |
| 4,715,983 | A * | 12/1987 | Ota et al. | 252/186.35 |
| 4,865,760 | A * | 9/1989 | Johnson et al. | 252/187.28 |
| 5,131,938 | A | 7/1992 | Girvan | |
| 5,352,409 | A | 10/1994 | Kierzkowski | |
| 5,427,748 | A | 6/1995 | Wiedrich et al. | |
| 5,478,482 | A | 12/1995 | Jones et al. | |
| 5,514,287 | A | 5/1996 | Jones et al. | |
| 5,648,314 | A | 7/1997 | Lachocki et al. | |
| 5,670,059 | A | 9/1997 | Jones et al. | |
| 5,674,429 | A | 10/1997 | Lachocki et al. | |
| 5,676,844 | A | 10/1997 | Girvan | |
| 5,863,496 | A * | 1/1999 | McElhany | 422/22 |
| 5,888,528 | A * | 3/1999 | Wellinghoff et al. | 424/405 |
| 6,022,480 | A | 2/2000 | Girvan et al. | |
| 6,207,074 | B1 | 3/2001 | Kincaid et al. | |
| 6,298,871 | B1 | 10/2001 | Pickens et al. | |
| 2003/0047451 | A1 * | 3/2003 | Bhullar et al. | 204/403.01 |
| 2004/0040915 | A1 | 3/2004 | Connelly, Jr. | |
| 2004/0191332 | A1 * | 9/2004 | Chang et al. | 424/661 |

FOREIGN PATENT DOCUMENTS

| | | | |
|---|---|---|---|
| JP | 57-11974 | A | 1/1982 |
| JP | 60-237001 | A | 11/1985 |
| JP | 1-128905 | A | 5/1989 |

* cited by examiner

*Primary Examiner*—Mark Eashoo
*Assistant Examiner*—Peter F Godenschwager
(74) *Attorney, Agent, or Firm*—Linda Pingitore; Irwin M. Stein

(57) ABSTRACT

Calcium hypochlorite compositions that are classified as a Packing Group III Division 5.1 oxidizer material or as a non-Division 5.1 oxidizer material are described. In one embodiment, the compositions comprise an admixture of particulate calcium hypochlorite and particulate metaboric acid. The calcium hypochlorite is present in the composition in an amount and is of a concentration such that the composition would be classified as a Packing Group II Division 5.1 oxidizer in the absence of said particulate metaboric acid. Other embodiments described are solid shaped articles, e.g., tablets, comprising the described calcium hypochlorite-metaboric acid composition.

20 Claims, No Drawings

CALCIUM HYPOCHLORITE COMPOSITION

CROSS REFERENCE TO RELATED APPLICATION

This application claims the benefit of U.S. Provisional Application Ser. No. 60/622,736 filed Oct. 28, 2004, which is herein incorporated by reference in its entirety.

BACKGROUND OF THE INVENTION

The sanitization of a standing or recirculating aqueous medium typically involves introducing a hypohalite, e.g., a hypochlorite, anion donor material, such as a halogen or halogen-containing material, e.g., calcium hypochlorite, into the aqueous medium so as to establish a desired level, e.g., a sanitizing amount, of free available halogen, e.g., free available chlorine (FAC), within the aqueous medium. The presence of free available chlorine within the aqueous medium, e.g., a swimming pool, serves to eradicate or control deleterious amounts of pathogenic bacteria, algae, etc that are present in the aqueous medium. As an oxidizer, hypochlorous acid can also remove nutrients from the water, thus providing indirect protection against microbial infestation. Sanitation of water contacted by humans and animals is required because exposure to unsanitized or inadequately sanitized water that contains deleterious amounts of pathogenic bacteria, viruses, protozoa, etc can lead to the development of infection or disease.

Free available chlorine can be established in an aqueous medium by adding regularly a source of hypochlorous acid (HOCl) or hypochlorite anion ($ClO^-$) to the water comprising the aqueous medium. Recreational bodies of water, e.g., swimming pools, hot tubs, spas, etc, typically are treated so as to contain FAC in an amount of from 1 to 3 parts per million parts (ppm). Water having a FAC content in amounts of greater than 10 ppm can be used to sanitize surfaces or articles to which it is applied.

Hypochlorous acid or hypochlorite anion is commonly introduced into water by passing the water, or a portion thereof, through a chlorination unit, which contains a donor source of the hypochlorous acid or hypochlorite anion. Other means include introducing chlorine directly into the water or adding the hypochlorous acid donor material directly into the body of water to be treated. A common donor source of hypochlorous acid or hypochlorite anion is calcium hypochlorite. Solid forms of calcium hypochlorite, e.g., granular calcium hypochlorite, can be added directly into the water to be treated, or placed in a chlorination unit, e.g., as granules or tablets. When contacted with water introduced into the chlorination unit, the calcium hypochlorite dissolves, thereby providing an aqueous solution comprising hypochlorite anion, which solution is added to the water to be treated.

In the case of a standing or recirculating body of water, e.g., swimming pools, periodic batch additions of higher levels of hypochlorite anion can be made to the body of water in addition to the relatively steady and lower level additions described previously. Such batch additions of higher levels of hypochlorite anion are commonly referred to as a "shock treatment" or as a "super chlorination" and are made on a periodic basis, e.g., once a week or once a month. Typically, the purpose of a shock treatment is to briefly increase the FAC of the body of water, e.g., by 5 to 20 ppm, to consume accumulated organic material, destroy chloramines and/or control algae blooms. A shock treatment is administered by, for example, preparing a concentrated aqueous solution of calcium hypochlorite from granulated calcium hypochlorite, and then adding this solution to the body of water, or distributing, e.g., broadcasting, granulated calcium hypochlorite directly over the surface of the body of water.

Depending on the volume of water that is to be sanitized, the amount of calcium hypochlorite that is stored on site for use in a chlorination unit and/or for shock treatments can be large. Calcium hypochlorite is a material that can cause or enhance the combustion of organic materials by providing oxygen for combustion, e.g., it serves as an oxidizer.

In accordance with Title 49, Code of Federal Regulations, part 173, section 127, paragraph (a), subparagraph (1), [49 CFR §173.127(a)(1)], calcium hypochlorite is categorized as a Division 5.1 oxidizer. It is classified as a Packing Group II oxidizer material [49 CFR §173.127(b)(ii)]. The transport of a material categorized as a Division 5.1 oxidizer requires the use of special precautions, which can include the use of special containers. The storage of NFPA (National Fire Protection Association) class 3 oxidizers (which UN Group II oxidizers will commonly be) can require separate free standing storage facilities and/or special sprinkler systems. Such special provisions for storage and handling can result in increased costs for these activities.

In addition to the special handling associated with the storage of calcium hypochlorite due to its oxidizer classification, there is also the matter of its storage stability, e.g., shelf life. In particular, loss of FAC upon storage of calcium hypochlorite, though much lower than with sodium hypochlorite, can be significant under some circumstances. Use of low assay calcium hypochlorite can result in inadequate sanitization of water to which it is added. Further, the loss of FAC upon storage can be accelerated if the calcium hypochlorite is formulated with materials that tend to enhance the loss of FAC during storage. For example, calcium hypochlorite compositions prepared from an admixture of calcium hypochlorite and boric acid can lose an appreciable amount of free available chlorine upon storage.

It is, therefore, desirable to develop a solid calcium hypochlorite composition that is not classified as a Packing Group I or Packing Group II Division 5.1 oxidizer, and which, in comparison to calcium hypochlorite that has not been blended with other additives, has a favorable stability with regard to FAC loss upon storage. It is also desirable that such a newly developed solid calcium hypochlorite composition have an FAC content at least sufficient to allow its use in the batch and/or continuous sanitization of an aqueous stream or body of water.

DESCRIPTION OF THE INVENTION

In accordance with the present invention there are provided, calcium hypochlorite compositions comprising an admixture of particulate calcium hypochlorite and particulate metaboric acid, which compositions are classified as a Packing Group III Division 5.1 oxidizer material or as a non-Division 5.1 oxidizer. The calcium hypochlorite used to prepare the foregoing compositions is present in an amount and is of a concentration such that said calcium hypochlorite compositions would be classified as a Packing Group II Division 5.1 oxidizer in the absence of an effective flame inhibitor, such as the herein described metaboric acid. In one embodiment, the calcium hypochlorite has an FAC content of at least 39% by weight. The metaboric acid is present in amounts sufficient to classify the calcium hypochlorite composition as a Packing Group III Division 5.1 oxidizer or as a non-Division 5.1 oxidizer, the latter being hereinafter referred to as a "Non-Oxidizer" or other similar terms. In accordance with the present invention there are further provided solid shaped articles comprising compositions of calcium hypochlorite and metaboric acid.

For purposes of this specification (other than in the operating examples) unless otherwise indicated) all numbers expressing quantities and ranges of ingredients, reaction conditions, etc, that are used in the following description and claims are to be understood as modified in all instances by the term "about". Accordingly, unless indicated to the contrary, the numerical parameters set forth in this description and attached claims are approximations that can vary depending upon the desired properties that are sought to be obtained by the present invention. At the very least, and not as an attempt to limit the application of the doctrine of equivalents to the scope of the attached claims, each numerical parameter should at least be construed in light of the number of reported significant digits and by applying ordinary rounding techniques. Further, as used in this specification and the attached claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurement. Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is having a minimum value equal to or greater than 1 and a maximum value of equal to or less than 10. Because the disclosed ranges are continuous, they include every value between the minimum and maximum values. Unless expressly indicated otherwise, the various numerical ranges specified in this application are approximations.

In one embodiment of the present invention, the compositions comprise a physical admixture of particulate calcium hypochlorite and particulate metaboric acid. In another embodiment of the present invention, there are contemplated solid shaped articles, e.g., tablets, comprising calcium hypochlorite having metaboric acid dispersed throughout the article, e.g., solid shaped articles prepared from the afore-described physical admixture. Calcium hypochlorite compositions of the present invention are formulated so that the resulting compositions are not assigned a classification as a US Department of Transportation Packing Group I or Packing Group II Division 5.1 oxidizer material. In one contemplated embodiment, the calcium hypochlorite compositions of the present invention are classified as a Packing Group III Division 5.1 oxidizer material. In another embodiment, those calcium hypochlorite compositions are classified as a non-Division 5.1 oxidizer.

In accordance with regulations of the US Department of Transportation, 49 CFR §173.127(a), an "oxidizer" (Division 5.1) is defined as a material that may, generally by yielding oxygen, cause or enhance the combustion of other materials. A solid material is classed as a Division 5.1 material if, when tested in accordance with the UN Manual of Tests and Criteria, blends of it with cellulose have mean burning times less than or equal to the burning time of a 3:7 potassium bromate-cellulose mixture [49 CFR §173.127(a)(1)].

Solid Division 5.1 materials are assigned packing groups using the following criteria [49 CFR §173.127(b)]:

(i) Packing Group I is the sub-classification of any material which, in the 4:1 or 1:1 sample to cellulose ratio (by mass) tested exhibits a mean burning time less than the mean burning time of a 3:2 mixture, by mass, of potassium bromate and cellulose.

(ii) Packing Group II is the sub-classification of any material which, in the 4:1 or 1:1 sample to cellulose ratio (by mass) tested exhibits a mean burning time less than the mean burning time of a 2:3 mixture, by mass, of potassium bromate and cellulose, and the criteria for Packing Group I are not met.

(iii) Packing Group III is the sub-classification of any material which, in the 4:1 or 1:1 sample to cellulose ratio (by mass) tested exhibits a mean burning time less than the mean burning time of a 3:7 mixture, by mass, of potassium bromate and cellulose, and the criteria for Packing Groups I and II are not met.

A non-Division 5.1 material is a material which, in the 4:1 or 1:1 sample to cellulose ratio (by mass) tested, does not ignite and burn, or exhibits a mean burning time greater than that of a 3:7 mixture, by mass, of potassium bromate and cellulose.

In accordance with one embodiment of the present invention, there are provided calcium hypochlorite compositions comprising a blend of particulate, e.g., granular, calcium hypochlorite, which is a known and commercially available material, and particulate metaboric acid, which compositions are classified as a Packing Group III Division 5.1 oxidizer or as a non-Division 5.1 oxidizer (Non-Oxidizer).

Chemically, commercially available calcium hypochlorite typically contains at least 39 or 45 weight percent available chlorine, more typically at least 50 or 55 weight percent available chlorine, and still more particularly at least 60 weight percent available chlorine, e.g., between 60 and 80 percent available chlorine. In one embodiment, commercially available calcium hypochlorite typically contains between 39 and 80 weight percent available chlorine, e.g., in alternate nonlimiting embodiments between 45 and 75, weight percent between 65 and 75 weight percent available chlorine or between 65 and 73 weight percent available chlorine. The remainder of such commercially available calcium hypochlorite is usually composed of varying amounts of water, and minor amounts of a mixture of inorganic by-product calcium and alkali metal salts incorporated during the manufacturing process. Such salts include, but are not limited to, sodium chloride, calcium chloride, calcium hydroxide, calcium carbonate and calcium chlorate. Water can comprise between 1 or 2 and 16 percent by weight, often less than 12 percent by weight, e.g., less than 10 percent by weight, often less than 8.5 percent by weight, of the calcium hypochlorite material. Often the amount of water contained in the calcium hypochlorite is between 5.5 and 16 percent, e.g., between 5.5 and 8.5 or 10 percent, by weight of the calcium hypochlorite material. The amount of water, either as free water or bound water, e.g., as hydrated salts, in the calcium hypochlorite can vary between any combination of the specified values, inclusive of the recited values. Any commercially available grade of calcium hypochlorite, e.g., such as the hydrated calcium hypochlorite material described herein, can be used to prepare the calcium hypochlorite compositions of the present invention, e.g., Non-Oxidizer compositions or Packing Group III compositions.

The particle size distribution of the particulate calcium hypochlorite materials used to prepare the compositions of the present invention can vary. The particulate size and particle size distribution of calcium hypochlorite that can be used in the present invention is not critical and thus any particulate material, e.g., from a powdery material to a granular material, can be used to prepare the compositions of the present invention. As a general guideline, particulate calcium hypochlorite typically has a principal size distribution between 100 and 6 mesh, as measured by the American Standard Test Method E11 Alternative Sieve Designation (ASTM E11 ASD); namely, the particles vary in size principally between 0.15 millimeters (mm) (0.006 inches) and 3.35 mm (0.13 inches). More commonly, the particles will have a principal size distribution between 60 mesh (0.25 mm) and 18 mesh (1.00 mm) based on ASTM E11 ASD. Further, when solid formed articles of Non-Oxidizer calcium hypochlorite compositions are prepared, one skilled in the art will typically select a particle size distribution for the calcium hypochlorite that is amenable to be compressed into the desired solid formed article, e.g., a tablet. An example of a commercially available granular calcium hypochlorite that can be used to prepare calcium hypochlorite compositions of the present invention, e.g., Non-Oxidizer compositions, is available from PPG Industries, Inc. under the trademark PITTCLOR®.

Calcium hypochlorite, as described herein, is typically present in the compositions of the present invention in amounts at least sufficient to provide a free available chlorine content that would result in such compositions being classified as an Oxidizer in the absence of the metaboric acid. In one embodiment, to sanitize an aqueous stream or body of water, the calcium hypochlorite is present in the compositions of the present invention in amounts sufficient to provide at least 39% by weight FAC, more usually at least 45% by weight FAC, based on the total composition weight. In a further embodiment, the calcium hypochlorite is present in the compositions in amounts that provide less than approximately 80% or 75% FAC by weight, e.g., less than 65% by weight FAC, based on total composition weight. Compositions prepared in accordance with the present invention can have present therein calcium hypochlorite in an amount sufficient to provide an FAC content ranging between any of these stated values, inclusive of the recited values.

Metaboric acid ($HBO_2$) (CAS 13460-50-9) is a solid material. Metaboric acid can exist in one of three crystal modifications or as a mixture of at least two of the crystalline forms, e.g., as a mixture of the orthorhombic and monoclinic forms. As used herein, the term metaboric acid is intended to mean and include a material that is one of the crystalline forms or is a mixture of at least two of the crystalline forms. Metaboric acid is available commercially in a finely-divided, e.g., powdered, form; but it is contemplated that the metaboric acid can be used in a larger particulate form, e.g., granular form, of approximately the same size as that of the calcium hypochlorite. Producing granular metaboric acid from a more finely-divided, e.g., powder, form can be accomplished be common size enlarging methods well known to those skilled in the art of solids management. Such methods include, but are not limited to, forming compacted metaboric acid by nodulizing, extruding or pressing and then crushing the resultant compacted metaboric acid to granules. Sieving of the crushed product may follow in order to obtain a particle size distribution that is appropriate for the intended application.

Metaboric acid can be prepared by heating boric acid at temperatures of from 110 to 130° C., e.g., in a rotary evaporator, or by heating boric acid at such temperatures under vacuum, e.g., in a vacuum oven or rotary evaporator. Since metaboric acid is hygroscopic, it should be protected from moisture present in the atmosphere to prevent it from reverting to boric acid, e.g., by use of a dry nitrogen (or other suitable chemically inert dry gas) blanket during its preparation and subsequent storage. Alternatively, the metaboric acid can be stored in a sealed container with only a small gas head space above the metaboric acid, thereby to limit the exposure of the metaboric acid to only the limited amount of moisture present in the small gas head space.

Metaboric acid is present in admixture with the calcium hypochlorite in the compositions of the present invention in amounts sufficient to produce a resulting blend that is classified as a non-5.1 Oxidizer material or at least an amount sufficient to produce a blend that is classified as a Packing Group III material. The exact amount of metaboric acid required for that purpose will depend, in part, on the FAC content of the solid calcium hypochlorite used to prepare the blended composition. Generally, as the FAC content of the calcium hypochlorite used increases, the amount of metaboric acid required to prepare the compositions of the present invention also increases. The amount of metaboric acid used in combination with the solid calcium hypochlorite will in one embodiment be at least 2 weight percent. In a further embodiment, the amount of metaboric acid used will be at least 4 weight percent, alternatively at least 10 or 15 weight percent, e.g., at least 20 weight percent, based on the total weight of the calcium hypochlorite composition. The amount of metaboric acid used in combination with the calcium hypochlorite will in one embodiment be less than 30 weight percent, based on the total weight of the calcium hypochlorite composition. In alternate embodiments, the amount of metaboric acid used can range between any combination of these stated values, inclusive of the recited values. In a particular contemplated embodiment, the amount of metaboric acid used ranges from 2 to 30 weight percent, typically from 15 to 30 weight percent.

Calcium hypochlorite compositions containing metaboric acid can be prepared readily by blending in a suitable vessel the desired amounts of particulate calcium hypochlorite, e.g., granular calcium hypochlorite, and particulate, e.g., powdery or granular, metaboric acid until the blend is substantially homogeneous. The resulting blends can then be recovered and used or packaged for sale, or formed into solid shaped articles, e.g., tablets.

Calcium hypochlorite compositions according to the present invention can also contain additives, e.g., adjuvants, that do not cause the composition to be classified as a Division 5.1 oxidizer or which otherwise deleteriously affect the sanitizing effectiveness of the composition. For example, when the calcium hypochlorite compositions of the present invention are formed into solid shaped articles, e.g., tablets, adjuvant additives that can be present include, but are not limited to, conventional dissolution rate modifiers, binders, buffering agents, and lubricants. Other additives that can be present when the calcium hypochlorite compositions are in either tablet or granular form include, but are not limited to, sodium tripolyphosphate, colorant-containing inorganic salts, such as those described in U.S. Pat. No. 5,049,385, at column 5, line 62 through column 7, line 8, and polyfluorinated polymers, such as those described in U.S. Pat. No. 4,970,020 at column 4, line 4 through column 6, line 8, which disclosures are incorporated entirely herein by reference.

In one non-limiting embodiment, use of metaboric acid in combination with calcium hypochlorite permits the preparation of calcium hypochlorite compositions having an available chlorine content of approximately 50%, which compositions can be classified as a Packing Group III oxidizer or as a non-Division 5.1 oxidizer. Further, calcium hypochlorite compositions that comprise metaboric acid and added inert inorganic solid diluent(s), such as anhydrous inorganic salts, are contemplated herein. Typically, the inorganic diluents are pH neutral. Such compositions, wherein the calcium hypochlorite is present in amounts sufficient to provide at least 39 percent by weight of free available chlorine, e.g., at least 50 weight percent free available chlorine, can be classified as a Packing Group III Division 5.1 oxidizer or as a non-Division 5.1 oxidizer.

Non-limiting examples of inert, inorganic anhydrous solid diluent materials include sodium chloride, potassium chloride, lithium chloride, calcium chloride, calcium oxide, calcium hydroxide, magnesium hydroxide, aluminum hydroxide, anhydrous sodium sulfate and mixtures of such inorganic inert materials. In particular, pH neutral salts are used. By inert is meant that the inorganic material does not affect substantially the shelf life of the calcium hypochlorite, or the SADT (self accelerating decomposition temperature) of the calcium hypochlorite. In one embodiment, calcium hypochlorite compositions comprising metaboric acid and solid inorganic, inert diluent materials, e.g., pH neutral salts, may be formulated to contain from 2 to 30, e.g., 2 to 20, weight percent of metaboric acid, from 10 to 25, e.g., 10 to 20, weight percent of the inorganic inert diluent material, and sufficient calcium hypochlorite so that the FAC (available chlorine) content of the composition is at least 39%, alternatively at least 45%. In a further alternative embodiment, the FAC is at least 50%, e.g., at least 55%.

In alternate non-limiting embodiments, adjuvant additives, including the added inert, inorganic diluent anhydrous materials, added to the solid calcium hypochlorite-metaboric acid compositions of the present invention may be present in amounts, for example, ranging from 0.001% to 15% by weight, alternatively from 0.01% to 12 percent by weight, e.g., from 0.1 to 5% by weight, based on the total weight of the composition. The amount of each of such additives that may be added to the calcium hypochlorite-metaboric acid compositions of the present invention may vary between any of the aforestated values, inclusive of the recited values. For example, non-limiting examples of such additives and their amounts include, but are not limited to, sodium tripolyphosphate, which in one embodiment can be present in amounts of from 1 to 5, e.g., 3 weight percent; and added inert salts, e.g., sodium chloride, which in one embodiment can be present in amounts of from 8 to 15, e.g., 10 to 12, weight percent.

It has been observed recently that the presence of boric acid and hydrated salts of boric acid, such as sodium tetraborate decahydrate, in contact with particulate, e.g., granular, calcium hypochlorite, can destabilize calcium hypochlorite compositions during storage. Hence, the addition of destabilizing amounts of boric acid and/or salts of boric acid to the herein described calcium hypochlorite-metaboric acid compositions in amounts of for example from 20 to 25 weight percent is undesirable. Also undesirable for the same reason is the addition of hydrated salts of metaboric acid, e.g., sodium metaborate tetrahydrate, to the herein described calcium hypochlorite-metaboric acid compositions.

In a further contemplated embodiment of the present invention, a particulate, inert hygroscopic material can be added to the calcium hypochlorite composition in relatively small amounts to capture relatively small amounts of free water, e.g., moisture, that is absorbed by the composition from the environment, e.g., due to high humidity, to absorb free water that is present in the original solid calcium hypochlorite, or to absorb water that is liberated from components of the composition during storage. Non-limiting examples of suitable hygroscopic materials are finely divided amorphous silica, e.g., precipitated silica, silica gel or pyrogenic (fumed) silica. In one embodiment, the hygroscopic material is present in amounts of less than 5 weight percent, based on the total weight of the calcium hypochlorite composition.

In another contemplated embodiment, at least one separate desiccant package, e.g., a canister containing a desiccant, is added to a container that is adapted to hold calcium hypochlorite compositions of the present invention, which can, for example, be in particulate form, e.g., granular material, or in the form of shaped articles, e.g., tablets. The desiccant package is adapted to absorb atmospheric moisture present in the container, which are present, for example, under conditions of high humidity, thereby to limit the calcium hypochlorite composition's exposure to such humidity. The container is generally fabricated from a material or materials that are chemically resistant to the calcium hypochlorite compositions described herein and that satisfy transportation regulations, e.g., U.S. Department of Transportation regulations. The size of the container may vary and in one embodiment, the container can be sized to accommodate anywhere from 1 to 400 pounds of material. Non-limiting examples of containers or packages include pouches, such as a single application package, boxes, gallon pails, drums, e.g., drums that contain 50, 100 and 400 pounds of material, etc, of the calcium hypochlorite-metaboric acid composition The calcium hypochlorite compositions of the present invention, usually in the form of granules, pellets or tablets, can be added directly to the aqueous medium to be treated, e.g., sanitized, or can be added to any suitable chlorination unit or device, which is used to prepare an aqueous solution of calcium hypochlorite, which solution in turn is used to sanitize an aqueous body of water, e.g., a swimming pool, hot tub or spa. It is also contemplated that such solutions can be used to sanitize solid surfaces employed to process food products for human and animal consumption. Examples of suitable chlorination units are those described in FIG. 1 of U.S. Pat. No. 5,384,102, FIG. 1 of U.S. Pat. No. 5,427,748 and FIG. 1 of U.S. Pat. No. 6,298,871 B1, which disclosures are incorporated entirely herein by reference.

An aqueous stream or body of water that has been sanitized by contact with calcium hypochlorite compositions of the present invention, or with aqueous calcium hypochlorite solutions prepared from such compositions, can be used in any number of applications, e.g., as cooling tower water, water used for swimming pools, hot tubs or spas, or hypochlorite ion-containing water used to sanitize the surface of an article. When used to sanitize the surface of an article, the sanitized water can be applied to such a surface by any appropriate method, examples of which include but are not limited to, spray application; wiping with soaked rags; curtain or waterfall application; and soaking by immersion.

Calcium hypochlorite compositions of the present invention, e.g., blends of calcium hypochlorite and metaboric acid, can be formed into solid shaped articles, including but not limited to, tablets, bricks, briquettes, pellets, etc, by conventional size enlargement equipment. Examples of such equipment include, but are not limited to, molding presses, tableting presses, roll-type presses, pellet mills and screw extruders. In one contemplated embodiment, the solid shaped article can have a mass of between 1 gram and 350 grams or more, e.g., between 7 and 300 grams. The size of the solid shaped article can vary widely and is determined typically by the intended application, such as the internal dimensions and specifications of a chlorination unit in which the solid shaped article is to be used, and/or conventional commercial handling and packaging units. In the case of a solid shaped article that is formed in the shape of a tablet having a mass of, for example, from 300 to 350 grams, the diameter of the tablet in one contemplated embodiment can be between 7.6 centimeters (cm) (3 inches) and 8.9 cm (3.5 inches), e.g., between 7.9 cm (3.125 inches) and 8.3 cm (3.25 inches), and have a thickness of from 2.5 cm (1 inch) to 5.1 cm (2 inches), e.g., 3.2 cm (1.25 inches). The dimensions of the tablet can vary between any combination of the aforestated values, inclusive of the recited values.

In a contemplated embodiment, granular calcium hypochlorite having a size distribution predominantly between 45 mesh and 10 mesh ASTM E11 ASD, e.g., the granules are principally between on average 0.36 mm (0.014 inches) and 2.00 mm (0.08 inches) is used to produce solid shaped articles such as tablets. Particles smaller than 50 mesh ASTM E11 ASD, e.g., 0.30 mm (0.012 inches), that are present in the granular calcium hypochlorite generally represent a minor percentage, usually less than 2 percent, of the material charged to a size enlargement device.

The particle size distribution of the solid metaboric acid used to prepare the compositions of the present invention can be the same as, but is not necessarily the same as, that of the solid, e.g., granular, calcium hypochlorite, e.g., between 45 and 10 mesh ASTM E-11 ASD.

The present invention is more particularly described in the examples that follow, which are intended to be illustrative only, since numerous modifications and variations therein will be apparent to those skilled in the art. Unless otherwise specified, all parts and percentages are by weight.

The test for oxidizing substances described in the United Nations Manual of Tests and Criteria was used to determine the oxidizer characteristics for the blends of calcium hypochlorite described in Example 6. The detailed test method is described in Section 34 of the aforementioned Manual ("Recommendations on the Transport of Dangerous Goods; Manual of Tests and Criteria"), (Revision 3), which is titled "Classification Procedures, Test Methods and Criteria Relating to Oxidizing Substances of Division 5.1". In the test, the relative burning rates of various oxidizers (calcium hypochlorite blends in the present case) are compared to those of other known oxidizers. On the basis of this test, a blend can be defined as an oxidizer or a non-oxidizer, and if it is an oxidizer, it can be further classified into one of three Packing Groups. Tests are conducted on the blends to be evaluated mixed with dry fibrous cellulose in mixing ratios of 1:1 and 4:1, by mass, of sample to cellulose. The burn time (in seconds) is compared to the standard 3:2, 2:3 or 3:7 mixture, by mass, of potassium bromate and cellulose. The classification assigned to the sample blends are based on the test criteria described earlier for Packing Groups I, II, III or for non-Division 5.1 oxidizer materials.

EXAMPLE 1

Granular Pittclor® calcium hypochlorite (2.185 milligrams) was placed in an aluminum hermetic pan and scanned in a TAI DSC 2920 differential scanning calorimeter in nitrogen from 25° C. to 500° C. at a rate of 10° C./minute (DSC). The calorimeter was calibrated with indium and tin standards. The nominal nitrogen purge rate was 50 milliliters (mL)/minute. The granular calcium hypochlorite had 70% available chlorine and approximately 7% water. Similar calcium hypochlorite material is commercially available from PPG Industries, Inc under the trade name Super Zappit®.

The data obtained from the DSC showed exotherms at 201° C. and 411° C., which represented the decomposition of the calcium hypochlorite.

EXAMPLE 2

The procedure of Example 1 was repeated with a sample (3.505 milligrams) comprising a blend of 3 parts by weight of the calcium hypochlorite of Example 1 and 1 part by weight of metaboric acid. The data obtained from the DSC showed no strong exotherms.

EXAMPLE 3

The procedure of Example 1 was repeated with a sample (3.505 milligrams) comprising a blend of 3 parts by weight of the calcium hypochlorite of Example 1 and 1 part by weight of sodium metaborate dihydrate. The data obtained from the DSC showed a mild decomposition exotherm at 61° C. and a stronger decomposition exotherm at 103° C.

EXAMPLE 4

The procedure of Example 1 was repeated with a sample (2.140 milligrams) comprising a blend of 3 parts by weight of the calcium hypochlorite of Example 1 and 1 part by weight of sodium metaborate tetrahydrate. The data obtained from the DSC showed strong decomposition exotherms at 61° C. and at 95° C.

The data of Example 2 shows surprisingly that metaboric acid does not thermally destabilize calcium hypochlorite, as demonstrated by the lack of strong exotherms during the DSC test (even up to 500° C.) and in particular in the normal main exotherm region of approximately 200° C. or less. There was a substantial endotherm at 174° C. and a lesser endotherm at 201° C., where there would normally be a calcium hypochlorite decomposition exotherm. The endotherm that results from the condensation reaction of metaboric acid to form water vapor and boric oxide offsets the heat produced by the decomposition of calcium hypochlorite. In contrast sodium metaborate dihydrate and sodium metaborate tetrahydrate do destabilize the calcium hypochlorite. In the case of sodium metaborate dihydrate (Example 3), the composition showed an exotherm at 103° C., which is a significantly lower temperature than the first exotherm (201° C.) exhibited by calcium hypochlorite alone (Example 1). The decomposition exotherm follows an endotherm from water loss. The release of water from the sodium metaborate can contribute to the destabilization of the calcium hypochlorite. In the case of sodium metaborate tetrahydrate (Example 4), the exotherm occurred at 95° C., which is also significantly lower than the first exotherm exhibited by calcium hypochlorite alone (Example 1).

EXAMPLE 5

Part A

Super Shock-It™ calcium hypochlorite (28 grams), which is available from PPG Industries, Inc., having an assay of approximately 65 weight percent free available chlorine (FAC) and approximately 7 weight percent water was charged to a 2 ounce (60 mL) glass jar and sealed. The glass jar was placed in an electric oven maintained at 49° C. After 144 hours in the oven, the test sample was removed and re-analyzed. The sample was found (average of two measurements) to have lost approximately 9% FAC. Initial and final FAC values were determined using a standard method of analysis, which method comprised adding an excess of potassium iodide and acetic acid to the hypochlorite sample and titrating the liberated iodine with standardized thiosulfate. The percent loss of FAC was calculated using the following equation:

$$100\times(\text{Initial } FAC-\text{Final } FAC)/(\text{Initial } FAC)$$

(In the case of the Final FAC calculation, the weight used is the weight of the calcium hypochlorite before exposure to elevated temperature. During high temperature exposure, there is some loss of weight due to formation of chlorine and water vapor. Failure to take this into account would result in underestimating the actual loss of available chlorine. This error is avoided by using the starting rather than the final weight of the sample). The lower the value of % loss of FAC, the more desirable is the composition.

Part B

The procedure of Part A was repeated except that the test sample was prepared by blending 21 grams of the granular calcium hypochlorite with 7 grams of metaboric acid (Aldrich catalog #41,345-3). After 144 hours in the 49° C. oven, the test sample was found (average of two measurements) to have lost approximately 2.2% FAC.

Part C

The procedure of Part A was repeated except that the test sample was prepared by blending 21 grams of the granular calcium hypochlorite with 7 grams of sodium metaborate dihydrate (US Borax sodium metaborate 4 mole Technical, 4046). After 144 hours in the 49° C. oven, the test sample was found (average of two measurements) to have lost approximately 10.8% FAC.

Part D

The procedure of Part A was repeated except that the test sample was prepared by blending 21 grams of the granular calcium hypochlorite with 7 grams of sodium metaborate tetrahydrate (Acros organic catalog #211635000). After 144 hours in the 49° C. oven, the test sample was found (average of two measurements) to have lost approximately 9.8% FAC.

Part E

The procedure of Part A was repeated except that the test sample was prepared by blending 21 grams of the granular calcium hypochlorite with 7 grams of sodium tetraborate pentahydrate (Girvan Proteam® Supreme, 99.5%). After 144 hours in the 49° C. oven, the test sample was found (average of two measurements) to have lost approximately 11.2% FAC.

The accelerated aging study of Example 5 shows that a blend of 75% calcium hypochlorite and 25% of metaboric acid loses significantly less free available chlorine than calcium hypochlorite alone or blends of 75% calcium hypochlorite and 25% of either sodium metaborate dihydrate, sodium metaborate tetrahydrate or sodium tetraborate pentahydrate.

EXAMPLE 6

Oxidizer classifications for the calcium hypochlorite blends described in this Example were determined by comparing burn test data of test blends and reference samples, which test data was generated according to the test method and procedures detailed in Section 34 of the *Recommendations on the Transport of Dangerous Goods, Manual of Tests and Criteria*, (Revision 2), United Nations, New York, 1999.

The burn test procedure can be summarized as follows. A 30 cm±1 cm length of nickel-chromium wire having a diameter of 0.6±0.05 mm and a resistivity of 6.0±0.5 ohms/meter was laid in a serpentine fashion over a circular area of 38.5 square centimeters ($cm^2$) on a 15 cm×15 cm×0.6 cm cement tile (plate or slab) having a thermal conductivity (at 0° C.) of 0.23 $W.m^{-1}.K^{-1}$. The wire was held in place by two electrically conductive screw-type contacts, located outside of the 38.5 $cm^2$ circular area. A homogeneously mixed reference sample (30 grams) was prepared from potassium bromate (pre-dried at 65° C. for a minimum of 12 hours) and cellulose (pre-dried at 115° C. for a minimum of 4 hours to contain less than 0.5% water by dry weight) in weight ratios of 3:7 respectively. The potassium bromate and cellulose were mixed together by hand in a small glass beaker using a spatula. The potassium bromate had a purity of 99% by weight, and was obtained from Fisher Scientific (catalog number P207-250). The cellulose used was in the form of a medium fiber powder having a Whatman® advanced ion exchange cellulose designation of CF-11, available from Fisher Scientific (catalog number 05-713-004), and was stored in a desiccator.

To a 60° conical glass funnel, having a large end diameter of 70 mm and a sealed small end, was added 30 grams of the reference sample. The 38.5 $cm^2$ circular area of the cement tile having the wire affixed to it, was placed over the 70 mm diameter opening of the filled funnel. The cement tile and funnel were together flipped over such that the funnel sat in an inverted fashion upon the block. The funnel was lifted away leaving a truncated conical pile of reference sample over the nickel-chromium wire to which was applied an alternating current sufficient to provide 150±7 watts of power. Current was applied to the wire throughout the duration of the test or for a maximum of three minutes if no burning of the sample was observed.

Burn times were taken from the moment power was applied to the wire until the sample was observed to stop burning. The burn time for the reference sample was taken from the average of five separate burn tests, which were performed under ambient atmospheric conditions. To minimize subjective influences on the results of the burn tests, a separate set of reference sample burn times were generated every time a set of test blends was evaluated. The burn time for potassium bromate-cellulose (3:7) reference samples averaged 83 seconds.

The test blends reported in Table 1 were prepared by adding the components of the blend to a beaker and mixing them by hand using a stainless steel spatula. The compositions were mixed until they were observed visually to be as homogenous as the particles would allow.

The test blends of calcium hypochlorite and metaboric acid or sodium metaborate dihydrate reported in Table 1 were mixed with cellulose in a ratio of 4:1 and 1:1 (blend:cellulose), and were evaluated in the same manner as the reference sample. Based on these comparisons, it was determined whether a given test sample, would be classified as a Division 5.1 oxidizer. If the average burn time of a test blend was observed to be less than or equal to that of the bromate-cellulose (3:7) reference sample, then the test blend was classified as a Division 5.1 oxidizer. Correspondingly, if the average burn time of a test blend was observed to be greater than that of the reference sample, then the test sample was not classified as a Division 5.1 oxidizer.

TABLE 1

| Ingredients | Blend Number 1 | 2 | 3 | 4 | 5 | 6 | 7 | 8 |
|---|---|---|---|---|---|---|---|---|
| Parts Calcium hypochlorite [a] | 86 | 86 | 82 | 82 | 78 | 78 | 74 | 74 |
| Parts $HBO_2$ [b] | 14 | 0 | 18 | 0 | 22 | 0 | 26 | 0 |
| Parts $NaBO_2\ 2H_2O$ [c] | 0 | 14 | 0 | 18 | 0 | 22 | 0 | 26 |
| Ave. Burn Time | 92 | 60 | 105 | 89 | >200 | 101 | >200 | >200 |
| 5.1 Oxidizer [d] | No | Yes | No | No | No | No | No | |

[a] Granular calcium hypochlorite, 98% by weight of which had a particle size of from 60 to 18 mesh ASTM E11 ASD. The granular calcium hypochlorite used had an FAC content of approximately 71% and contained approximately 6.5% by weight of water, based on total weight.
[b] Metaboric Acid (99%, Aldrich catalog # 41,345-3).
[c] Sodium Metaborate Dihydrate (Technical, US Borax)
[d] Based on UN Division 5.1 Oxidizer Classification Test. Blends having a burn time greater than 83 seconds are considered as non-oxidizers.

The results tabulated in Table 1 show that a blend of calcium hypochlorite and as little as 14% metaboric acid provides a burn time that is greater than the reference sample (83 seconds) and therefore is categorized as a non-Division 5.1 oxidizer. A similar blend of calcium hypochlorite and sodium metaborate dihydrate had a shorter burn time than that of the reference sample, and therefore is a Division 5.1 oxidizer.

The present invention has been described with reference to specific details of particular embodiments thereof. It is not intended that such details be regarded as limitations upon the scope of the invention except insofar as and to the extent that they are included in the accompanying claims.

What is claimed is:

1. A solid calcium hypochlorite composition consisting essentially of an admixture of particulate calcium hypochlorite, particulate metaboric acid, and optionally an inert hygroscopic inorganic material, wherein said metaboric acid is present in said composition in an amount such that the composition is classified as a Packing Group III Division 5.1 oxidizer or as a non-Division 5.1 oxidizer, and wherein said calcium hypochlorite is present in an amount and is of a concentration such that calcium hypochlorite composition would be classified as a Packing Group II Division 5.1 oxidizer in the absence of said particulate metaboric acid.

2. The composition of claim 1 wherein said calcium hypochlorite provides from 39% to 80% by weight free available chlorine, based oil the total weight of said composition.

3. The composition of claim 1 wherein the amount of metaboric acid in the composition ranges from 2 to 30 weight percent.

4. The composition of claim 1 wherein the amount of water associated with said calcium hypochlorite is less than 8.5 weight percent.

5. The composition of claim 1 further comprising less than 5 weight percent of said inert hygroscopic inorganic material.

6. The composition of claim 5 wherein said inert hygroscopic inorganic material is amorphous silica.

7. A solid shaped article prepared from the composition of claim 1.

8. The solid shaped article of claim 7 wherein the article is in the form of a tablet, said tablet having a mass of from 300 to 350 grams.

9. The solid shaped article of claim 7 wherein the calcium hypochiorite provides from 39% to 75% by weight of free available chlorine, based on the total weight of the composition, and the metaboric acid is present in the article in an amount of from 2 to 30 weight percent.

10. The composition of claim 1 wherein said calcium hypochlorite provides from 39% to 75% by weight free available chlorine, based on the total weight of said composition, wherein the amount of water associated with said calcium hypochlorite is less than 8.5%, and the amount of metaboric acid in the composition ranges from 15 to 30 weight percent.

11. The composition of claim 10 wherein the calcium hypochlorite composition is in the form of a solid shaped article, said shaped article having a mass of from 1 to 350 grams.

12. A solid calcium hypochlorite composition consisting essentially of an admixture of particulate calcium hypochlorite, particulate metaboric acid and particulate, inert inorganic material, said metaboric acid and inert inorganic material being present in amounts such that the composition is classified as a Packing Group III Division 5.1 oxidizer or as a non-Division 5.1 oxidizer, said calcium hypochlorite being present in amounts sufficient to provide at least 39 percent by weight of free available chlorine.

13. The composition of claim 12 wherein the particulate, inert inorganic material is selected from sodium chloride, potassium chloride, lithium chloride, calcium chloride, calcium oxide, calcium hydroxide, magnesium hydroxide, aluminum hydroxide, anhydrous sodium sulfate and mixtures of said particulate, inert inorganic materials.

14. The composition of claim 13 wherein the inert inorganic material is an anhydrous, pH neutral salt.

15. The composition of claim 13 wherein the metaboric acid is present in amounts of from 2 to 30 weight percent, the particulate, inert inorganic material is present in amounts of from 10 to 25 weight percent and the calcium hypochlorite is present in amounts sufficient to provide at least 39% by weight of free available chlorine.

16. A calcium hypochlorite package comprising (i) a solid calcium hypochlorite composition consisting essentially of an admixture of calcium hypochlorite, particulate metaboric acid, and optionally particulate, inert inorganic material, wherein said metaboric acid is present in said composition in amounts such that the composition is classified as a Packing Group III Division 5.1 oxidizer or as a non-Division 5.1 oxidizer, and wherein said calcium hypochiorite is present in amounts sufficient to provide at least 39 percent by weight of free available chlorine, and (ii) at least one separate package that contains a desiccant.

17. The calcium hypochiorite package of claim 16 wherein the calcium hypochlorite provides from 39% to 75% by weight flee available chlorine, based on the total weight of the calcium hypochlorite composition, and the amount of metaboric acid in the composition ranges from 2 to 30 weight percent.

18. The calcium hypochiorite package of claim 16 wherein the calcium hypochlorite composition further comprises said particulate, inert inorganic material.

19. The calcium hypochlorite package of claim 18 wherein the inert inorganic salt is sodium chloride.

20. The calcium hypochlorite package of claim 19 wherein the metaboric acid is present in amounts of from 2 to 30 weight percent, the sodium chloride is present in amounts of from 10 to 25 weight percent and the calcium hypochlorite is present in amounts sufficient to provide at least 39% by weight of free available chlorine.

* * * * *